United States Patent Office 3,297,777
Patented Jan. 10, 1967

3,297,777
OXIDATIVE DEHYDROGENATION PROCESS
Roy L. Grantom, Alvin, Tex., and Leo J. Spillane, Chesterfield, Mo., assignors to Monsanto Company, a corporation of Delaware
Filed Jan. 2, 1964, Ser. No. 335,080
16 Claims. (Cl. 260—683.3)

The present invention relates to a process for the conversion of hydrocarbons. More particularly, the present invention relates to a process for the thermal transformation, by non-catalytic partial combustion, of low-molecular-weight saturated hydrocarbons to gaseous mono-olefin hydrocarbons.

With the ever-increasing use of plastic materials in commerce and industry, there is also a constantly-increasing demand for sources of raw materials for producing these plastics. One of the most important of the raw materials for producing plastics is the group of normally-gaseous mono-olefin hydrocarbon monomers which include ethylene, propylene and butylenes. Probably one of the least valuable groups of hydrocarbons is the saturated paraffinic hydrocarbons. These materials are of little octane value in fuel utilization and are highly unreactive. For these reasons, there is a constant search within the chemical field for new and improved methods of converting the low value paraffinic hydrocarbons to more valuable materials such as the above-mentioned mono-olefin monomers. The conversion of paraffin hydrocarbons to olefin hydrocarbons by cracking, both catalytic and thermal, is known. Several specific processes have been advanced. However, because of various deficiencies in these processes as well as for commercial reasons, there is an unrelenting search for new processes and methods for such hydrocarbon conversions.

It is an object of this invention to provide a process for the thermal transformation of paraffin hydrocarbons. A further object of this invention is to provide a process whereby low-molecular-weight saturated hydrocarbons are converted by non-catalytic partial combustion to normally-gaseous mono-olefin hydrocarbons. Additional objects will become apparent from the following description of the invention herein disclosed.

In fulfillment of these and other objects, it has been found that when low-molecular-weight saturated hydrocarbons are subjected to partial combustion in a single-stage reaction chamber having a venturi opening at its exit end, at temperatures of 1000° to 1500° F. and pressures of 20 to 120 p.s.i.a and a ratio of saturated hydrocarbon to oxygen of 0.4 to 2.0 moles of hydrocarbon per mole of oxygen and at relatively high flow rates and low residence time in the reaction chamber, excellent yields of normally-gaseous mono-olefin hydrocarbons, i.e., ethylene, propylene, butylene, are obtained.

Figure 1:
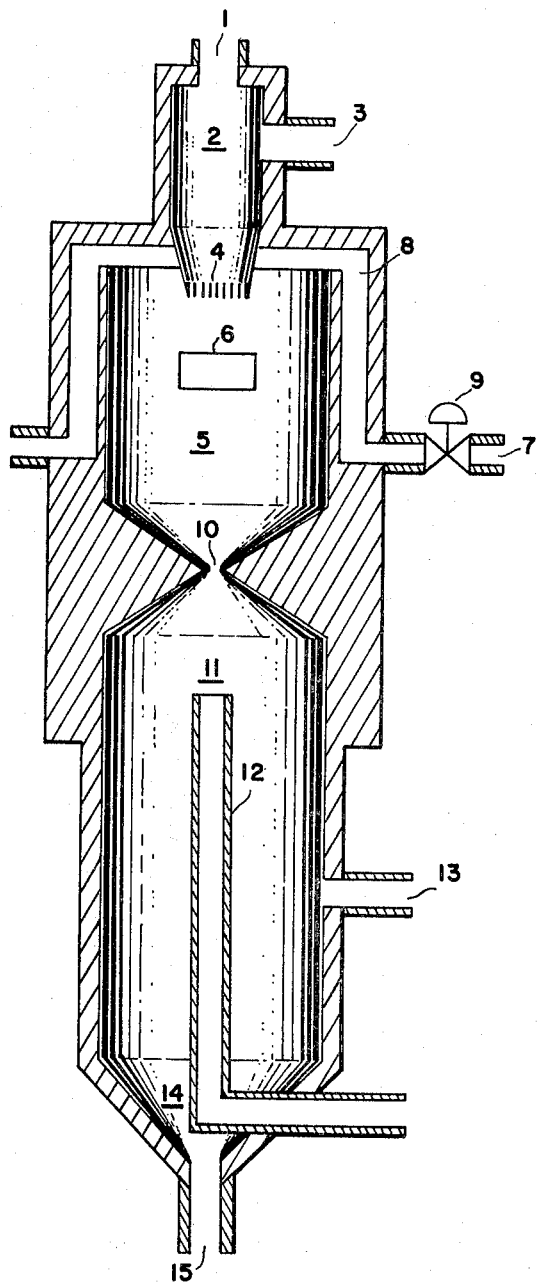
Figure 2:
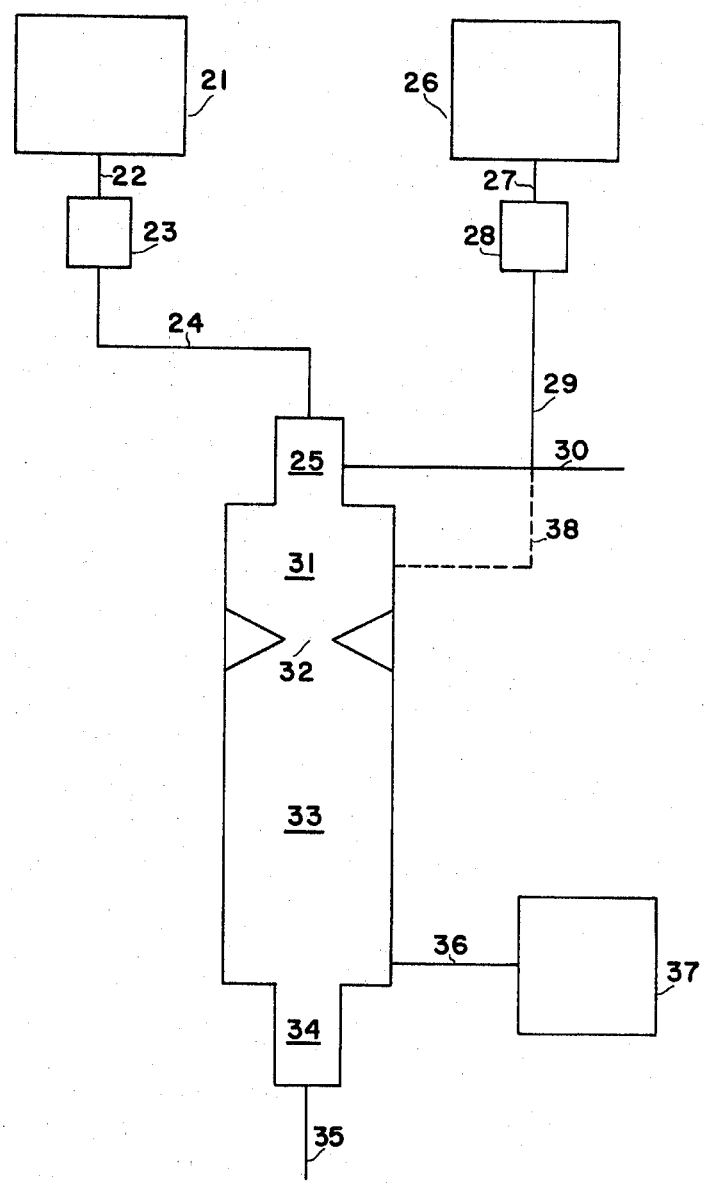

The apparatus and operation of the present invention is more aptly described and illustrated by reference to the accompanying drawings. FIGURE 1 presents a diagrammatic cross-sectional view of the reaction unit which is used in the preferred practice of the present invention. FIGURE 2 is a schematic flow diagram of the entire process including the reaction unit of FIGURE 1.

Referring to FIGURE 1, a preheated liquid hydrocarbon feed stream is passed into mixing head 2 by means of line 1. Preheated oxygen or air is brought into the mixing zone through line 3. The mixed hydrocarbons and oxygen are then forced into reaction chamber 5 through spray nozzle 4 which increases uniformity of mixing of the feed fuels entering into reaction chamber 5. The spray type nozzle has the added advantage of preventing flashbacks, premature ignition, etc. The hydrocarbon and oxygen sprayed into reaction chamber 5 are ignited by igniting surface 6. Igniting surface 6 may be a spark plug or any other suitable device and may be placed anywhere in the reaction chamber but shall remain so located that the incoming oxygen and hydrocarbon will strike the igniting surface. Once combustion is initiated the igniting surface is of no further use since the reaction is autogenous. It is not necessary that an igniting surface be used since spontaneous ignition may occur if the oxygen and feedstock are heated prior to entry into the reactor.

In FIGURE 1 is shown an alternate arrangement for the introduction of the oxygen or air into the reaction chamber. This alternate arrangement allows the heat of the reaction chamber to be used for preheating purposes. This is accomplished by introducing the oxygen into the reaction chamber through line 7 and annular passage 8. If this alternate arrangement is not used, the annular passages are closed off at valve 9 and thus they become insulating aids.

The reaction chamber may be lined with any suitable refractory material. It also may be of any shape and size consistent with good flow characteristics and certain limitations as to length and width discussed later in the specification. The reaction chamber of this process is characterized by having a constricted opening at its exit end, the optimum amount of constriction varying with feedstocks and other considerations.

The reaction product of the combustion of the hydrocarbon feed in the reaction chamber next passes through constructed venturi opening 10. Generally, for flow and other design characteristics, it is desirable to use a converging and diverging nozzle arrangement as exemplified by the sloping lines leading to constricted opening 10. It is to be understood, of course, that the degree of slope and the ratios of slope of convergence to slope of divergence are not to be in any way limited by the drawing in FIGURE 1. On passing through constricted opening 10, the gases are expanded into exhaust chamber 11. The rapid expansion of the gases in the exhaust chamber brings about a proportionally rapid lowering of the temperature of the gaseous reaction products. The divergence of the exhaust chamber may be so designed that the expansion of the hot product gases will sufficiently quench the effluent gaseous reaction product stream thus alleviating any need for further cooling. However, a coolant such as water may be injected into the exhaust stream to aid the expansion quench. A coolant has the added advantage of slowing the high velocity gaseous products and simultaneously removing the heat generated by the slowing action. This coolant may be injected through line 12 or may be injected through the walls at an angle to the path of the exhaust stream or may be injected co-current with the exhaust stream. Any liquid products which are condensed from the exhaust stream are collected in tank 14 and are removed by line 15. The non-condensed product gases exit the exhaust chamber through line 13.

FIGURE 2 presents the flow arrangement of the process of this invention. The hydrocarbon mixture storage or source is represented by 21. Feed from storage flows by line 22 into preheater 23 and then by line 24 into mixing zone 25. The oxygen or air is taken from storage or source 26 by means of line 27 into preheater 28 and then by line 29 into mixing zone 25. If a diluent gas such as steam, nitrogen, etc., is used, it may be introduced into the oxygen line through line 30. Also, if it is desired to use the alternate arrangement of oxygen entry described in the explanation of FIGURE 1, the oxygen stream may be fed into the reaction chamber by means of line 48. The reactants pass from mixing zone 25 into reaction chamber 31. The products are passed through constricted opening 32 and expanded into the exhaust chamber 33. In this chamber cooling of the hot products takes place, either by expansion of the hot gases or by both expansion and injection of a coolant or by injection of a coolant alone. The liquid products, if any, collect in tank 34 and are removed by line 35. The non-condensed gaseous products then are removed through line 36 into collection or storage tank 37.

It will become readily apparent to those skilled in the art that a great number of variations and modifications of the equipment and flow arrangement as presented in FIGURES 1 and 2 may be made without departing in any way from the spirit and scope of this invention. It is to be understood that within the preceding process description, the use of the word oxygen is to include air also.

To further illustrate the invention herein disclosed, the following examples are presented. It is to be understood, of course, that these examples are in no way to be construed as limiting the application, operation, or conditions of this invention.

*Example 1*

The feedstock to this run was a butane fraction having an analysis of 86.5% by weight n-butane and 13.5% isobutanes. The reaction unit used in this run was constructed similar to FIGURE 1 and was of steel coated on the inside with silicon carbide coating. This reaction unit had a reaction chamber approximately 4.5 in. in length and ⅞ in. in diameter. At its exit end, the reaction chamber had an opening of 0.21 in. in diameter and an angle of convergence of 41°. Opposite the converging slope, the reaction unit diverged at a slope of 41°. Pure oxygen was used. Operating conditions were as follows:

| | |
|---|---|
| Butane flow rate, liters/min. | 35.6 |
| $O_2$ flow rates, liters/min. | 44.4 |
| Reactor chamber temperatures, °F. | 1100–1400 |
| Reactor chamber pressure, p.s.i.g. | 18–20 |
| Chamber flow velocity, ft./sec. | 29 |
| Chamber residence time, sec. | 0.013 |

The yield and product data were as follows:

| | |
|---|---|
| Ethylene, wt. percent | 23.0 |
| Propylene, wt. percent | 18.7 |
| Total mono-olefins, wt. percent | 41.7 |

*Example 2*

Example 1 was substantially repeated with the exception that some of the operating conditions were changed as follows:

| | |
|---|---|
| Butane flow rate, liters/min. | 30 |
| $O_2$ flow rates, liters/min. | 50 |
| Reactor chamber pressure, p.s.i.g. | 12 |

Yields were:

| | |
|---|---|
| Ethylene, wt. percent | 27.2 |
| Propylene, wt. percent | 14.7 |
| Total mono-olefins, wt. percent | 41.9 |

From the above examples, it is believed clearly apparent that the present invention presents a highly advantageous method of obtaining normally-gaseous mono-olefins from low-molecular-weight saturated hydrocarbons.

The feedstocks to the present invention are the low-molecular-weight paraffin hydrocarbons, including straight-chain, branch-chain and cycloparaffins. For the purpose of the present invention, it is generally preferred that the feed be non-cyclic in nature, however. Usually the feed to the present invention will be a paraffinic hydrocarbon of not more than 10 carbon atoms. Several non-limiting examples of such hydrocarbons are propane, n-butane, isobutanes, n-pentane, isopentanes, n-hexane, isohexanes, n-heptane, isoheptanes, n-octane, iso-octanes, n-nonane, iso-nonanes, n-decane and isodecanes.

The preferred feedstocks to the present invention are the paraffinic hydrocarbons having 3 to 5 carbon atoms. This preferred group of compounds includes propane, butanes, and pentanes. It is, of course, within the purview of the present invention that combinations of these paraffinic hydrocarbons may be used.

The phrase "normally-gaseous mono-olefins" is used throughout this specification in referring to ethylene, propylene, and butylenes.

The reaction temperatures for the practice of the present invention may range generally from 1000 to 1500° F. A preferred temperature range for the reaction is from approximately 1050 to 1450° F. Generally, it may be stated that as the molecular weight of the hydrocarbon feed is increased there is an increase in the temperature. However, the optimum temperatures for particular hydrocarbon feeds are within the above ranges. At temperatures below the above ranges, reaction becomes economically unfeasible and at temperatures greater than the above range, there is substantial carbon formation and coking of the reactor. For the preferred feedstocks to the present invention, temperatures of 1100 to 1400° F. within the reaction chamber will usually be employed.

Temperatures in the reaction chamber may be controlled by controlling preheat temperature, feed rates, feed-to-oxygen ratios, and residence time. However, it is often found desirable to use diluents in the reaction chamber for temperature control. The diluents may be water (generally as steam), nitrogen, or other such inert materials. Diluents function to reduce carbon and coke formation by preventing polymerization and other secondary reactions of the olefins formed in the reaction chamber. Also, diluents aid in the control of the temperature within the reaction chamber. Probably the most useful diluent, from a process standpoint, is steam because of its higher heat capacity and the ease with which it can be separated from the products.

Generally, pressures of 20 to 120 p.s.i.a. will be utilized in the reaction chamber of the present process. The pressure will in most instances be greater with lower molecular weight paraffinic feeds. The preferred pressures for operating the present process are within the range of from approximately 30 to 70 p.s.i.a.

At any given temperature and chamber pressure, there is an optimum hydrocarbon to oxygen mol ratio which generally will be within the range of from approximately 0.4:1 to 2:1. If oxygen concentrations outside of this range are employed, the present invention becomes economically impractical to operate. The preferred hydrocarbon to oxygen mol ratios are within the range of from approximately 0.6:1 to 1.3:1. Generally, throughout this application reference is made to oxygen; however, it is to be understood that this is not limiting the practice of the present invention to pure oxygen. On the contrary, it is more practical and much less expensive to use an oxygen-containing gas such as air. Of course, when air is used, it is necessary to take into consideration the inert components of the air in determining flow rates, concentrations, heat requirements, etc. Such is well within the ability of those skilled in the art.

Input rates of both the hydrocarbon feed and the combustion supporting gases have considerable effect on the reactor temperature. As input flows increase there is an increase in temperature. This, of course, may be compensated for to some degree by the manipulation of the other operating variables. The feed flow rates which are within the practical applicability of the present invention, as set forth herein, are 500 to 1000 gaseous volumes of feed per minute per volume of reaction space within the reaction chamber. More preferred flow rates for the hydrocarbon feed are found in the range 1000 to 5000 gaseous volumes of feed per minute per volume of reaction space. The input flow rates of the combustion supporting gases and diluents will, of course, be dependent upon the desired ratio of these gases to the feed. If high feed flow rates are used with the result of higher temperatures, this will cause the formation of more gaseous olefins.

Long residence times within the reaction chamber increase the yield of normally-gaseous mono-olefins up to a point. However, if residence is maintained within the reaction chamber for too long a period of time, there is a formation of excessive quantities of coke and carbon as well as such gaseous products as CO. Residence times generally will be within the range of from 0.005 to 0.5 second. Preferably, however, the residence time will be maintained within the range of from approximately 0.01 to 0.1 second. Residence time is, of course, to a large extent limited by temperature, pressure, feedstock, reactor flow velocity and the reactor design. The last of these, reactor design, is generally considered to be fixed and not, therefore, a variable. However, for the temperatures, pressures, etc., described herein for the operation of the present invention, the residence time will be within the above-described ranges.

The flow velocity of the reactants through the reaction chamber should be within the broad range of from 5 to 500 feet per second. Velocities of 10 to 300 feet per second will generally yield somewhat better results, however. Within these ranges flow velocities will vary in accordance with the considerations expressed in regard to residence time, e.g., feed flow rates, temperatures, pressures, feedstocks, desired product and reactor design.

The reaction unit utilized in the process herein described will generally have a cylindrical internal surface. It may be constructed of any material which will withstand the physical requirements of temperature and pressure and will not adversely affect the reaction taking place within. Materials adversely affecting the reaction may be used with an internal lining of a suitable refractory material such as alundum, hard carbon or graphite. A non-limiting example of a suitable reaction unit is one constructed of steel with an internal fused alumina lining.

In the design of the reaction chamber, a proper ratio between the length and diameter of the reaction chamber must be maintained. This is especially true in processing heavier feedstocks in that if the reaction chamber is overly long in relation to its diameter, a significant amount of carbon and tar formation takes place as a result of secondary condensations in the reaction chamber. By utilizing a proper reaction length, much or all of this carbon and tar formation caused by secondary condensations may be eliminated. The criticality of the length-to-diameter ratio becomes less as the feedstock becomes lighter. The ratio of length to diameter may vary from 0.5:1 to 15:1, but preferably from 1:1 to 10:1.

The relationship between the diameters of the exit opening of the reaction chamber and the reaction chamber has considerable effect on reactor flow velocities, residence time and pressures in that the pressure ratio between the reaction chamber and the exhaust or expansion chamber is primarily controlled by the size of the exit orifice. For this reason, the ratio of the diameters of the exit opening and the reaction chamber is generally expressed as a pressure ratio which is defined as the ratio of the pressure on the reaction chamber side of the venturi to the pressure on exhaust or expansion chamber side of the venturi. The pressure ratios at which the present process is operable may range from 1.2:1 to 10:1. A more preferred pressure ratio, however, would be within the range of 2:1 to 7:1.

The exit venturi of the reaction chamber generally consists of the venturi opening itself and a converging and diverging section as shown in FIGURE 1. The angles of convergence and divergence are given as the angle between the converging and diverging slope and the plane of the walls of the reaction chamber. The angle of convergence from the reaction chamber wall to the exit venturi may range from 10 to 90° with a generally more useful and practical range being from 30 to 75°. The angle of divergence from the exit venturi wall to the exhaust chamber wall may vary from 5 to 90°, a more preferred range being 30 to 75°.

The exhaust or expansion chamber of this reaction unit is not strictly defined. It generally is considered to include the diverging area immediately following the exit venturi. Actually, it is within this diverging section of the exit venturi that expansion begins and in many cases all expansion takes place in this area. The exhaust or expansion chamber then functions as an area where the gaseous products exiting the reaction chamber are rapidly expanded and thereby cooled. The gaseous products on passing through the exit venturi attain high velocities and in expansion in the diverging area of the expansion chamber reach even higher velocities. It is a second function of the exhaust or expansion chamber to decelerate these gaseous products back to speeds practical for condensation and collection of any vaporized liquid products obtained and for control and collection of the product gases.

The size of the exhaust chamber is not critical within broad limitations. It must be large enough in diameter to allow some expansion and of a length sufficient for deceleration of high velocity gaseous products. Water or other coolants may be injected into the hot high velocity gases to aid both in cooling and in slowing these gaseous products. Injection of coolants may be made countercurrent, co-current, or at an angle to the direction of flow of the gaseous products. The use of coolants will generally allow smaller exhaust chambers in the reaction units. The upper limit in size of the exhaust chamber is governed only by the practical physical size of the chamber.

The exhaust chamber as shown in the drawing FIGURE 1 provides a collection tank for condensed liquids at its end. This is, of course, optional with the particular feed to the present invention. If the feeds to the present invention are such low-molecular-weight hydrocarbons as propane, butane, pentanes, etc., few if any, liquids will be obtained from the reaction chamber. However, when higher-molecular-weight materials such as, for example, nonanes and decanes, are used as feed to the present invention, there may be some liquid material obtained from the reaction chamber which consists of unreacted feed material as well as some lower-molecular-weight liquid hydrocarbons formed during the reaction. While the exhaust chamber arrangement shown in FIGURE 1 is a very useful arrangement for collection of the product condensed within the exhaust chamber, if any, it is not intended to be limiting to the present invention in any way. Any number of methods for collecting any liquid products condensed in the exhaust chamber will be readily apparent to anyone skilled in the art.

For introduction of the reactants into the reaction chamber, a spray type mixing head as illustrated by FIGURE 1 is preferred. However, any of the many variations of this type of mixing head or any other mixing head may be used in the practice of the present invention, though not necessarily with equivalent results. The reactants may also be introduced separately as by the introduction of one of the reactants through annular passages surrounding the reaction chamber as shown in FIGURE 1 of the accompanying drawings. This method of introducing reactants into the reaction chamber has the advantage of utilizing heat produced in the reaction chamber for the preheating of the reactant.

What is claimed is:

1. A process for the non-catalytic partial combustion of low-molecular weight paraffinic hydrocarbons to produce polymerizable mono-olefin hydrocarbons, the process comprising introducing a feed consisting essentially of paraffinic hydrocarbons of 3 to 5 carbon atoms per molecule concurrently with an oxygen-containing gas in a mole ratio of hydrocarbon to oxygen of 0.4:1 to 2:1 into a reaction unit comprised of two chambers connected by a constricted passageway, with the first chamber being a reaction chamber, and constructed in such manner that the length to diameter ratio of the chamber is 0.5:1 to 15:1, and the second chamber being an expansion chamber, with the hydrocarbon feed input rate to the reaction chamber at 500 to 1000 gaseous volumes of feed per minute per volume of reaction space within the reaction chamber, the temperature within the reaction chamber being in a range of about 1000 to 1500° F., the reactor chamber pressure being in a range of about 20 to 120 p.s.i.a. and the pressure ratio between the reaction chamber and the expansion chamber being maintained within a range of approximately 1.2:1 to 10:1, and with the chamber flow velocity being at approximately 10 to 500 feet per second and the residence time of the reactants in the reaction chamber being in a range of about 0.005 to 0.5 second, thereafter passing the high temperature, high velocity gaseous products through the constricted passageway into the expansion chamber, thereby effecting rapid cooling through the adiabatic expansion of the gaseous products exiting the constricted passageway and causing deceleration of the gaseous products in order that they might be more readily collected.

2. The process of claim 1 wherein the mole ratio of hydrocarbon to oxygen is 0.6:1 to 1.3:1.

3. The process of claim 1 wherein the pressure in the reaction chamber is 30 to 70 p.s.i.a.

4. The process of claim 1 wherein the pressure ratio between the reaction chamber and the expansion chamber is maintained at 2:1 to 7:1.

5. The process of claim 1 wherein the oxygen-containing gas is pure oxygen.

6. The process of claim 1 wherein the residence time is 0.01 to 0.1 sec.

7. The process of claim 1 wherein the temperature within the reaction chamber is 1050 to 1450° F.

8. The process of claim 1 wherein the hydrocarbon feedstock is butanes.

9. A process for the non-catalytic partial oxidation of low-molecular weight saturated hydrocarbon feedstocks to produce mono-olefin hydrocarbons, said process comprising introducing a saturated hydrocarbon feedstock consisting essentially of saturated hydrocarbons of 3 to 5 carbon atoms per molecule concurrently with an oxygen-containing gas selected from the group consisting of oxygen, air and mixtures thereof in a mole ratio of hydrocarbon feedstock to oxygen of 0.4:1 to 2:1 into a reaction zone at a hydrocarbon feed input rate of 500 to 1000 gaseous volumes of feed per minute per volume of reaction space within the reaction zone, the temperature within the reaction zone being in the range of about 1000 to 15000° F., the reaction zone pressure being in the range of 20 to 120 p.s.i.a., the flow velocity of the reactants within the reaction zone being approximately 10 to 500 feet per second and the residence time of the reactants in the reaction chamber being in the range of 0.005 second to 0.5 second, thereafter passing the high temperature gaseous products into a cooling zone wherein said gaseous products are rapidly cooled by adiabatic expansion of the gaseous products into the cooling zone, the cooling zone being maintained at a pressure with respect to the pressure of the reaction zone such as to cause a reaction zone to cooling zone pressure ratio of 1.2:1 to 10:1.

10. The process of claim 9 wherein the mole ratio of hydrocarbon to oxygen is 0.6:1 to 1.3:1.

11. The process of claim 9 wherein the pressure in the reaction chamber is 30 to 70 p.s.i.a.

12. The process of claim 9 wherein the pressure ratio between the reaction chamber and the expansion chamber is maintained at 2:1 to 7:1.

13. The process of claim 9 wherein the oxygen-containing gas is pure oxygen.

14. The process of claim 9 wherein the residence time is 0.01 to 0.1 sec.

15. The process of claim 9 wherein the temperature within the reaction chamber is 1050 to 1450° F.

16. The process of claim 9 wherein the hydrocarbon feedstock is butanes.

References Cited by the Examiner

UNITED STATES PATENTS

| | | | |
|---|---|---|---|
| 2,727,932 | 12/1955 | Evans et al. | 260—683.3 |
| 2,727,933 | 12/1955 | Evans et al. | 260—683.3 |
| 3,119,111 | 1/1964 | McDonald et al. | 260—683.3 |
| 3,170,863 | 2/1965 | Spillane et al. | 260—683.3 |

DELBERT E. GANTZ, *Primary Examiner.*

SAMUEL P. JONES, *Assistant Examiner.*